(12) United States Patent
Marcelli et al.

(10) Patent No.: US 8,812,055 B2
(45) Date of Patent: Aug. 19, 2014

(54) METHOD AND SYSTEM FOR DISPLAYING USER-RELATED INFORMATION ON USERS' HANDSETS

(75) Inventors: Maurizio Marcelli, Rome (IT); Sergio Collesei, Turin (IT); Fabio Ricciato, Turin (IT); Francesco Baietto, Turin (IT); Marco Funari, Rome (IT)

(73) Assignee: Telecom Italia S.p.A., Milan (IT)

( * ) Notice: Subject to any disclaimer, the term of this patent is extended or adjusted under 35 U.S.C. 154(b) by 576 days.

(21) Appl. No.: 12/738,500

(22) PCT Filed: Oct. 18, 2007

(86) PCT No.: PCT/EP2007/061148
§ 371 (c)(1),
(2), (4) Date: Apr. 16, 2010

(87) PCT Pub. No.: WO2009/049679
PCT Pub. Date: Apr. 23, 2009

(65) Prior Publication Data
US 2010/0216439 A1 Aug. 26, 2010

(51) Int. Cl.
*H04B 1/38* (2006.01)
(52) U.S. Cl.
USPC ........... 455/558; 455/406; 455/418; 455/420; 455/425
(58) Field of Classification Search
USPC ............... 455/414.1, 418–420, 406, 425, 558
See application file for complete search history.

(56) References Cited

U.S. PATENT DOCUMENTS

| | | | | |
|---|---|---|---|---|
| 7,363,032 | B2* | 4/2008 | Phillips et al. | 455/422.1 |
| 8,271,948 | B2* | 9/2012 | Talozi et al. | 717/124 |
| 2006/0183477 | A1* | 8/2006 | Bocking et al. | 455/435.2 |
| 2008/0051057 | A1* | 2/2008 | Bliss | 455/404.1 |
| 2008/0083005 | A1* | 4/2008 | Kim | 725/118 |
| 2009/0176479 | A1* | 7/2009 | Vikberg et al. | 455/406 |
| 2010/0093345 | A1* | 4/2010 | Verhoef et al. | 455/433 |

FOREIGN PATENT DOCUMENTS

| | | |
|---|---|---|
| CA | 2275329 C | 2/2006 |
| EP | 1732302 A1 | 12/2006 |
| FR | 2810837 A1 | 6/2000 |
| WO | 00/18156 A1 | 3/2000 |
| WO | 03/077585 A1 | 9/2003 |
| WO | 2006/105618 A1 | 10/2006 |

OTHER PUBLICATIONS

International Search Report and Written Opinion dtd Sep. 17, 2008, PCT/EP2007/061148.
"Universal Mobile Telecommunications System (UMTS); Characteristics of the USIM application (3GPP TS 31.102 version 6.9.0 Release 6); ETSI TS 131 102", ETSI Standards, Lis, Sophia Antipolis Cedex, France, vol. 3-T3, No. V6.9.0, Mar. 1, 2005.
Notice of Non-Final Rejection mailed Mar. 11, 2014, KR Appln. 10-2010-7010793, English transaltion.

(Continued)

*Primary Examiner* — Tuan Pham
(74) *Attorney, Agent, or Firm* — Banner & Witcoff, Ltd.

(57) ABSTRACT

A method of displaying user-related information to a user on a display of a user's mobile telephony handset, including modifying a content of a file resident in a subscriber identification module operatively associated with the user's mobile telephony handset and used to store a name of a mobile telephony operator, said modifying comprising writing in said file the user-related information to be displayed.

22 Claims, 4 Drawing Sheets

(56) References Cited

OTHER PUBLICATIONS

3GPP TS 31.102 V6.9.0 Technical Specification (published in Mar. 2005), 178 pages.

3GPP TS 22.101 V6.9.0 Technical Specification (published in Mar. 2005), 42 pages.

* cited by examiner

METHOD AND SYSTEM FOR DISPLAYING USER-RELATED INFORMATION ON USERS' HANDSETS

CROSS REFERENCE TO RELATED APPLICATIONS

This is a U.S. National Phase Application under 35 U.S.C. §371 of International Application No. PCT/EP2007/061148 filed Oct. 18, 2007, which was published under PCT Article 21(2), the entire contents of which are incorporated herein by reference.

BACKGROUND OF THE INVENTION

The present invention relates in general to mobile communications, particularly to mobile telephony, and to mobile telephony networks like second-generation (2G) networks, such as GSM (General System for Mobile communications) networks, GPRS (General Packet Radio System) networks, EDGE (Enhanced Data rate for GSM Evolution) networks, and third-generation (3G) networks, such as UMTS (Universal Mobile Telecommunications System) networks. More specifically, the present invention concerns a method and system for displaying information on users' handsets.

DESCRIPTION OF RELATED ART

Recently, methods to implement a differentiation of call billing tariffs based on the location of a user's mobile phone (the handset or, as also referred to hereinafter, the "Mobile Equipment", shortly ME) have been deployed in mobile telephony networks.

For example, some mobile telephony operators have started offering so-called "home zone", "office zone" or "city zone" tariff schemes, providing for connectivity tariffs that are more advantageous for the user when she/he is in some determined locations (for instance at home, at the office or in some defined urban area).

Many of these methods are based on the active role played by the network equipments, that, through different techniques (like for example the identification of the network cell—based on the cell identifier "CELL-ID" that univocally identifies a generic network cell—the ME is attached to, or by more sophisticated methods based on radio signal measurements performed by the handset), recognize that the user is in a certain zone in respect of which she/he has subscribed or is anyway entitled to have facilitated (discounted) call billing tariffs.

Other known methods are based on the fact that the UICC (UMTS Integrated Circuit Card, which is the integrated-circuit chip card used in 3G mobile phones, and corresponds to—extending the functionalities of—the Subscribed Identity Module—SIM—card used in 2G mobile phones) alerts the network equipments that the user has entered in the differentiated-tariff zone. Basically, the network operator downloads to the UICC (which stores them) the identifier CELL-ID of the base radio station providing coverage to the zone with differentiated tariff; in same other cases the network operator downloads to the UICC values of radio signal measurements the ME usually performs to determine the better base radio station to attach to; the use of these measurements can improve the precision of the localization of the ME in the mobile telephony operator network based on different signal strengths from more than one base radio station. Periodically, the UICC asks the ME to provide the identifier CELL-ID of the network cell it is currently connected to (or the current radio signal measurements): if the current CELL-ID (or radio signal measurements) matches with that (those) previously stored, the UICC alerts the network equipments of the necessity to apply a different tariff scheme. In other cases, some kind of learning mode is activated in order to make the UICC learn by itself the network cell identifiers (or radio signal measurements) characteristic of the zone(s) corresponding to differentiated tariffs.

Irrespective of the solution adopted for identifying when the user enters a zone corresponding to a differentiated tariff, a common issue is how to make the user aware of the fact that she/he has entered that zone. This is regarded as a key aspect from the user experience perspective: the user should have the perception of her/his presence in the defined zone, and be alerted when she/he enters it.

Some known solutions alerts the user through a voice message after she/he dials a telephone number and places a call, or through a modified version of the audible tone.

In CA 2275329, a system for displaying greetings to mobile terminals identifying services associated with location based services is disclosed. The system identifies a plurality of service zones in the system, and also transmits predefined services to mobile terminals when located in the service zones. The system transmits from each base station local zone profile information to each of the mobile terminals located in those service zones. Each mobile terminal has stored therein subscriber zone profile information for which that mobile terminal can receive location based services. The mobile terminal also stores an associated greeting for each zone of subscriber zone profile information. The mobile terminal compares transmitted local zone information with the list of stored subscriber zone profile information, and when a match is found, the mobile terminal displays the greeting associated with the subscriber zone profile information. By storing the associated greeting in the mobile terminal, the otherwise signaling of greeting information over the air interface is avoided.

WO 00/18156 describes a possibility to differentiate services, both in time and space, a mobile telephone subscriber has access to in a cellular mobile telephone network. The subscriber is given specific functionality in a geographical limited area. The subscriber can for instance have full access to the mobile telephone network when he/she uses the mobile telephone within a certain area, whereas outside this area he/she is only given a certain functionality, no functionality, or full functionality but at another price rate. There is also the possibility to identify several areas with differentiated functionality. In the same way the subscriber can be given specific functionality at certain times during the 24-hour period, or during certain days. According to the solution proposed in that document, by means of SIM Application Toolkit the whole functional differentiation can be managed from the SIM-card. The subscriber's functional differentiation can be changed because the list over allowed/wanted areas exists in the SIM-card and can be updated via data message.

In FR 2810837 a tariff setting mobile telephone position finding system is described having SIM card with application applying learning mode measuring RF environment and later verification comparing new/old measurements. The verification of the mobile telephone position determination system has a mobile telephone with SIM card. The card has an application finding position. The application sets a learning mode registering the parameter characteristics of the environment. In a later verification mode, the RF parameters are measured again and compared with the registered values. This allows determination of whether the position is the same as in the learning mode. The mobile telephone position determination system has a SIM card with a special application. The application sets a learning mode, measuring the RF environment. At a later stage, the measurements are repeated in a verification stage and the two sets of measurements compared.

SUMMARY OF THE INVENTION

The Applicant has observed that the known solutions for making a user aware of the fact that she/he has entered or is currently located in a zone corresponding to a differentiated tariff scheme are not totally satisfactory.

In particular, a problem of those solutions that alert the user through a voice message after she/he dials a number and places a call, or through a modified version of the audible tone, resides in that the user is made aware of the fact that she/he has entered and is currently located in a differentiated-tariff zone only after she/he places a call. This is regarded as undesirable, because the user is not made aware essentially in real time of her/his entrance in a differentiated-zone tariff. Also, the user may erroneously believe to be currently located in a discounted-tariff zone, while instead the discounted tariff does not apply in the location she/he currently is, for example because the ME is, for some reason of radio coverage, attached to a cell not included in those for which the discounted tariff applies.

Solutions relying on applications residing on the SIM or USIM to show, through STK (SIM application ToolKit) commands like the "DISPLAY TEXT" command, a pop-up on the ME display are also believed not satisfactory; in this case, the alert is displayed only once and the user may loose it. In addition, the user experience is often inconsistent when different handsets are used, because any handset may display different indications; also, many of the already circulating MEs may not support the STK feature.

The Applicant also believes important that the implementation of this kind of services does not involve any active action performed by the user (exception made possibly for the subscription of the service), and particularly no download of software/firmware to be installed on the user ME.

On the other hand, the great variety of handsets circulating on the market and owned by the users makes a solution to this problem challenging.

The Applicant has found a method that enables showing on a user's handset display a variety of user-related information (particularly, but—as will be explained—non limitatively, information adapted to alert the user that she/he has entered a differentiated-tariff zone), without the need of installing any software/firmware on the mobile phone, and adapted to be implemented also on relatively old mobile phone models.

In particular, the Applicant has found that user-related information, related to an individual user of a mobile telephony handset, can be caused to be displayed on the user's handset display by modifying a content of a file resident in a subscriber identification module operatively associated with the user's mobile telephony handset, said file being intended, and normally used, to store a name of a mobile telephony operator to be displayed to any user whose handset is attached to the network of that operator.

According to an aspect of the present invention, a method is provided of displaying user-related information to a user on a display of a user's mobile telephony handset, comprising:
modifying a content of a file resident in a subscriber identification module operatively associated with the user's mobile telephony handset and used to store a name of a mobile telephony operator, said modifying comprising writing in said file the user-related information to be displayed.

Said user-related information may in particular include information which, when displayed on the display of the user's mobile telephony handset, is adapted to alert the user of a mobile telephony service billing tariff currently applied to the user, by a mobile telephony network to which the user's mobile telephony handset is attached to, to mobile telephony services exploitable by that user.

Said mobile telephony service billing tariff may be one among at least two mobile telephony service billing tariffs of a differentiated billing tariff scheme applied by a mobile telephony operator to the user.

Said at least two mobile telephony service billing tariffs may correspond to respective predetermined locations of the user's mobile telephony handset, and wherein said writing in said file is performed in response to detecting that the mobile telephony handset of the user is currently located in one of said predetermined locations.

Said detecting may comprise comparing an identifier of a mobile telephony network cell the mobile telephony handset is currently attached to with at least one predetermined network cell identifier, or comparing radio signal measurements performed by the mobile telephony handset on a radio signal irradiated by the mobile telephony network cell the mobile telephony handset is currently attached to with reference radio signal measurement values.

Said comparing may be performed by the mobile telephony handset.

Said at least two mobile telephony service billing tariffs may also correspond to different time periods.

Said writing in said file may be performed in response to detecting that the mobile telephony handset of the user is currently connected to a wireless sensor network, and said information may be adapted to alert the user of the connection to the wireless sensor network.

Said user-related information to be written in said file may be stored locally at the mobile telephony handset, in the subscriber identification module.

Said user-related information may be adapted to alert the user of the mobile telephony handset of a receipt of one or more messages in a user message box held by the mobile telephony network and associated with the user.

Said user-related information to be displayed may be received by the mobile telephony handset from the mobile telephony network over the air.

Said subscriber identification module may be compliant to the 3GPP Technical Specifications 22.101 and 31.102, said file being the EF-SPN.

Another aspect of the present invention relates to a subscriber identification module for use in a mobile telephony handset, comprising:
a resident file used to store a name of a mobile telephony operator to be displayed on the mobile telephony handset when attached to a network of said mobile telephony operator, and
an application resident in the subscriber identification module and operable to modify a content of the file by writing therein user-related information to be displayed on the mobile telephony handset.

Said user-related information may include information which, when displayed on the display of the user's mobile telephony handset, is adapted to alert the user of a mobile telephony service billing tariff currently applied to the user, by a mobile telephony network to which the user's mobile telephony handset is attached to, to mobile telephony services exploitable by that user.

Said application may be adapted to perform said writing in response to detecting that the mobile telephony handset is currently located in one of at least two predetermined locations of the user's mobile telephony handset in respect of which different mobile telephony service billing tariffs applies to mobile telephony services exploitable by a user of the mobile telephony handset.

The subscriber identification module may be operable to perform said detecting by comparing an identifier of a mobile telephony network cell the mobile telephony handset is currently attached to with at least one predetermined network cell identifier, or by comparing radio signal measurements performed by the mobile telephony handset on a radio signal irradiated by the mobile telephony network cell the mobile telephony handset is currently attached to with reference radio signal measurement values.

Said at least two mobile telephony service billing tariffs may correspond to different time periods.

Said application may be adapted to perform said writing in said file in response to detecting that the mobile telephony handset of the user is currently connected to a wireless sensor network, and said user-related information is adapted to alert the user of the connection to the wireless sensor network.

The subscriber identification module may be operable to locally store said user-related information to be displayed.

The subscriber identification module may be operable to receive said user-related information to be displayed from the mobile telephony network over the air.

Said subscriber identification module may be compliant to the 3GPP Technical Specifications 22.101 and 31.102, said file being the EF-SPN.

Said application may be a SIM application toolkit application.

BRIEF DESCRIPTION OF THE DRAWINGS

These and other features and advantages of the present invention will be made apparent by reading the following detailed description of some embodiments thereof, provided purely by way of non-limitative examples, description that will be conducted making reference to the attached drawings, wherein.

DETAILED DESCRIPTION OF SOME INVENTION EMBODIMENTS

Figure 1:
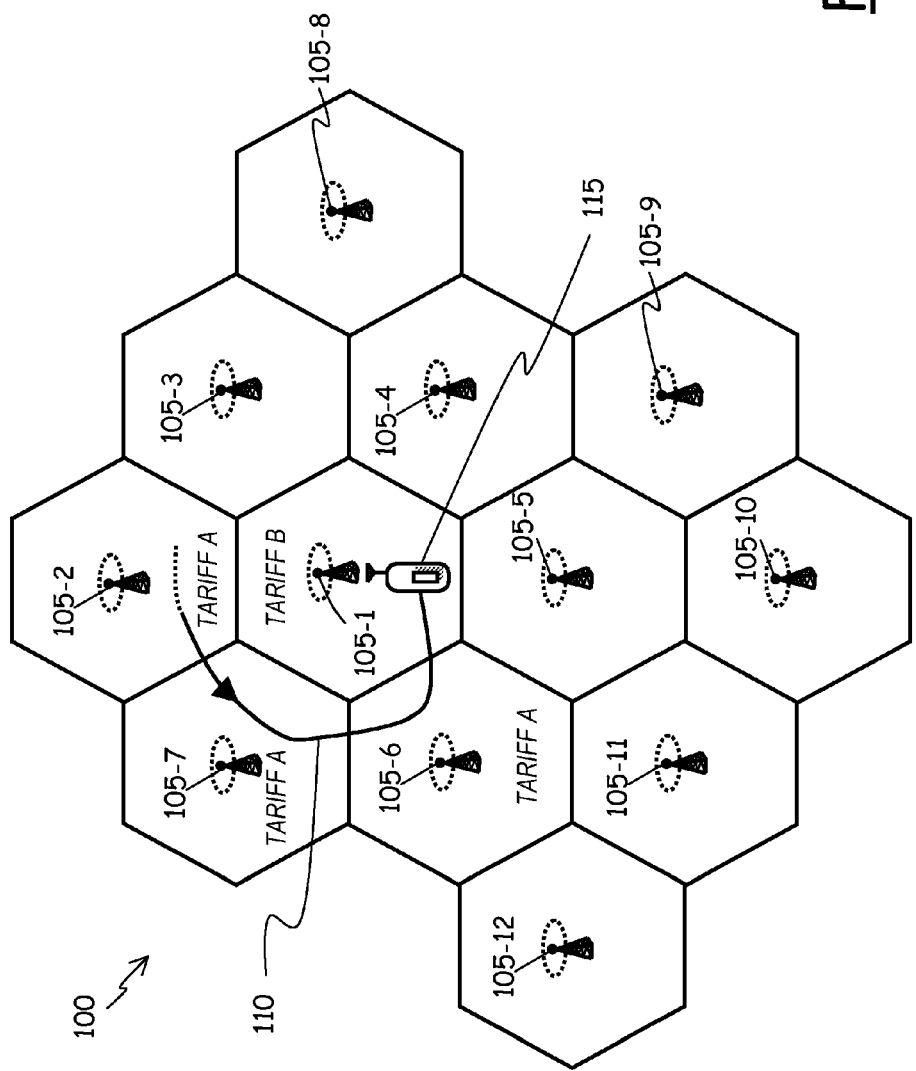
FIG. 1 pictorially shows a scenario wherein an embodiment of the present invention can be usefully applied.

With reference to the drawings, in FIG. 1 a scenario wherein an embodiment of the present invention can be usefully applied is pictorially shown.

In particular, reference numeral 100 denotes a (small portion of a) geographic area where a mobile telephony network, particularly a cellular network, is deployed; the cellular network may be a 2G cellular network, e.g. a GSM network, a GPRS network, an EDGE network, or a 3G cellular network, like a UMTS network, or a heterogeneous network, supporting both 2G and 3G standards. The specific type of cellular network is per-se not limitative to the present invention.

Schematically depicted in FIG. 1 is a plurality of transceiver stations (or radio base stations) 105-1 to 105-12, deployed across the considered geographic area 100; the transceiver stations may be Base Transceiver Stations (BTSs) of a GSM network, or Node-Bs of a UMTS network.

Each transceiver station 105-1 to 105-12 is shown in conjunction with an associated cell, being the portion of the geographic area 100 which is served by the considered transceiver station, i.e. the portion of the geographic area 100 where the signal received by that transceiver station is essentially the strongest among the signals possibly received by other transceiver stations; the generic transceiver station 105-1 to 105-12 is said to be the "best server" in the respective cell. In the drawing, merely for the sake of illustration simplicity, the cells are depicted as having all hexagonal shape and being of the same size, however in practical cases the cells will in general be different in shape and/or size, depending on several factors like the power of the respective transceiver stations, and the morphology of the area 100, which affects the propagation of the electromagnetic field. For avoiding unnecessary complication of the drawing, throughout the present description the cells will be denoted by the same reference numeral of the corresponding best server transceiver station.

Also schematically depicted in FIG. 1 is a hypothetical mobility path 110 supposed to be followed by a user equipped with a mobile communications terminal, like a mobile phone, hereinafter also referred to as handset or Mobile Equipment (ME), identified by reference numeral 115. In the example shown, it is assumed that the mobility path 110 passes through cells 105-2, 105-7, 105-6 and 105-1.

In an embodiment of the present invention, it is assumed that the operator of the mobile telephony network covering the geographic area 100 offers to individual subscriber users phone call or other connectivity services billing tariffs that are differentiated on the basis of the location of the user while placing the calls, possibly user-personalized tariffs. In particular, in the exemplary embodiment herein discussed, a first and a second different tariffs denoted "TARIFF A" and "TARIFF B" are considered, wherein the second tariff "TARIFF B" may be a discounted tariff which the mobile telephony network operator applies to calls made by the user owning the ME 115 when she/he is located for instance at home (home zone tariff), or at the office (office zone tariff). Considering the cells through which the hypothetical mobility path 110 followed by the owner of the ME 115 passes, the cells 105-2, 105-7, 105-6 are assumed to correspond to zones wherein the first tariff "TARIFF A" applies, whereas the cell 105-1 is assumed to correspond to a zone wherein the second tariff "TARIFF B" applies (for example, the cell 105-1 may cover an area where the home of the user is located). Other examples of differentiated call billing schemes are possible, like for example city zone tariffs which apply to calls placed by the users when they are located in a certain urban area; it is intended that the specific type of differentiated call or connectivity service billing scheme, as well as the number of different tariffs, are not limitative to the present invention.

Figure 2:
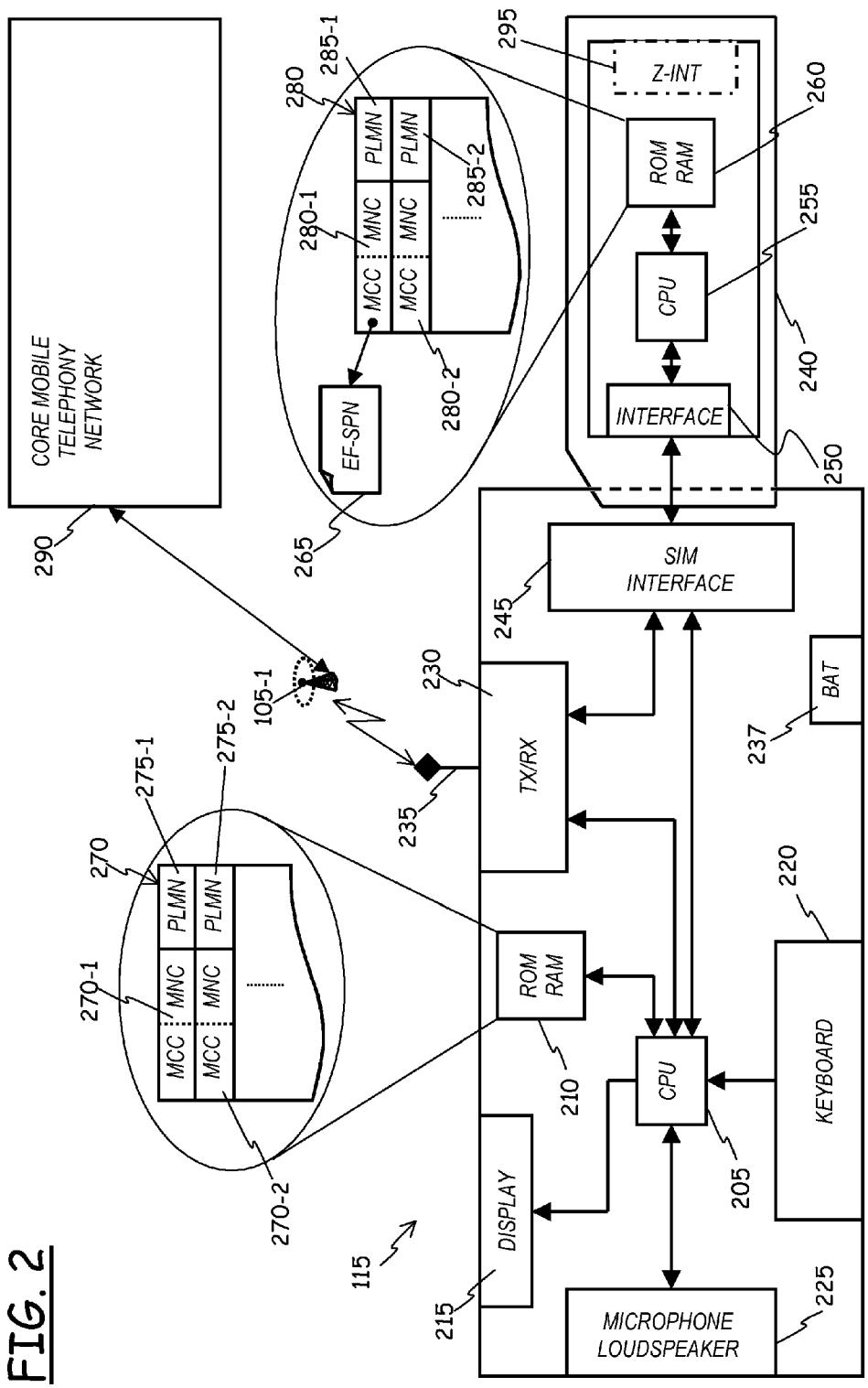
FIG. 2 schematically shows, in terms of functional blocks, a user's handset.

Referring now to FIG. 2, the structure of the ME 115 is schematically shown, in terms of functional blocks. A CPU (Central Processing Unit) 205 (typically, a microprocessor or a microcontroller) governs the ME operation; for its operation, the CPU 205 exploits memory resources 210, typically comprising RAM (Random Access Memory) and ROM (Read Only Memory); the RAM is used as a working memory, for loading programs under execution, and for temporarily storing data; the ROM (which may be or include an electrically-alterable memory, like an EEPROM—Electrically Erasable and Programmable ROM—or a Flash memory) is used to non-volatily store data including a basic software/firmware to be executed by the CPU 205, including an operative system, one or more programs to be executed by the ME 115, other data to be preserved like an address book. All or part of the memory resources 210 may be internal to the CPU 205 (this is typically the case when the CPU is a microcontroller). The CPU 205 interacts with a display device 215, used for displaying information to the user, a keyboard 220, through which the user may dial phone numbers and enter other data and commands, a microphone and a loudspeaker 225. A transmitter and receiver unit 230 with an antenna 235 allows the ME 115 wirelessly communicating with the (transceiver stations of the) mobile telephony network via radio signals. A battery pack 237 provides the power supply for the operation of the ME 115.

For its operation, the ME 115 has to be coupled to a module 240 for the secure identification of the subscriber to the services provided by the mobile telephony network. Typically, the module 240 is a card embedding an Integrated Circuit (IC) chip (a smart card), and in the GSM system it is commonly referred to as the "SIM card" (i.e., a card including a Subscriber Identity Module), whereas in the UMTS system it is called "UICC" (UMTS Integrated Circuit Card), and includes a USIM (UMTS SIM); another example of subscriber identification module card is the R-UIM (Removable User Identity Module) or CSIM (CDMA SIM) card, a card developed for CDMA handsets that is functionally equivalent to the SIM and USIM except that it is capable of working in both CDMA and GSM phones and networks.

The SIM card/UICC 240, which can be removably coupled to the ME 115 and is portable and usable in different handsets, interfaces to the ME 115 by means of interface modules 245 and 250, one provided in the ME 115 and the other in the SIM card/UICC 240.

The subscriber identification module 240 generally includes a CPU 255, which communicates with the ME 115 via the interface 250, and memory resources 260, including RAM and ROM (possibly EEPROM or Flash memories), used by the CPU 255 for its operation, as well as to retain data like phone numbers and other data, either accessible and modifiable by the user or not. Through the interfaces 245 and 250, the CPU can also directly interact with the transmitter and receiver unit 230 of the ME 115.

The subscriber identification module 240 stores in particular information used to authenticate and identify subscribers in the mobile telephony network; such information includes the ICCID (IC Card IDentifier, a code univocally identifying the subscriber identification module throughout the world), the IMSI (International Mobile Subscriber Identity, a unique code allowing the subscriber identification module, and thus the subscriber possessing it, to be identified by the mobile telephony network operator that issued it to the respective subscriber), the authentication key (a code used in the process of authentication of the subscriber identification module, and thus the subscriber possessing it, on the mobile telephony network), the LAI (Local Area Identity), mobile telephony network operator-specific emergency phone numbers, the SMSC (Short Message Service Center) number, just to cite some.

In particular, the subscriber identification module 240 may store, for example in a file 265, information about the service provider (i.e., the mobile telephony network operator) name. In particular, the 3GPP (3rd Generation Partnership Project) TS (Technical Specification) 31.102 Section 4.2.12 ("$EF_{SPN}$ (Service Provider Name)"), which is incorporated herein by reference, defines a standard for the fields of the file 265 used to store in the UICC the service provider name: the file, which is part of the SIM card/UICC file system, is called EF-SPN (Elementary File—Service Provider Name) has a fixed size, in the current standard of 17 Bytes, in the current standard the first Byte, is used to set display conditions for the SPN, whereas the remaining 16 Bytes contain a string with the SPN. The string may be coded using the default alphabet used for SMS.

The use of the information stored in the EF-SPN is set forth in 3GPP TS 22.101, Annex A, Sections A.3 ("Country/PLMN indication") and A.4 ("Service Provider Name indication", also incorporated herein by reference, which prescribes that the SPN is stored in the USIM in text (and/or optionally in graphic format using references—a link—between the EF_SPN and a file EF_IMG—Elementary File IMaGe—intended to contain a digital form of an image to be displayed), and that when the ME 115 is registered on the HPLMN (Home Public Land Mobile Network, i.e. the mobile telephony network of the operator to which the user of the ME 155 has subscribed) or on one of the other PLMNs used for SPN display (for example, the PLMNs of other operators with which the operator of the HPLMN has established roaming agreements), the SPN stored in the USIM is displayed on the ME display device 215.

As schematically depicted in FIG. 2, the ME 115 stores, for example in a table 270 in its ROM, a list of combinations 270-1, 270-2, ... of codes MCC (Mobile Country Code) and MNC (Mobile Network Code). The generic MCC is a code, in current standards consisting of three binary digits, that corresponds and identifies a respective country of the world; the generic MNC is a code, in current standards consisting of two binary digits, that corresponds and identifies a respective mobile telephony network present in a certain country of the world; thus, a generic MCC and MNC codes combination univocally identifies a certain mobile telephony operator in a certain country. Associated with each MCC and MNC codes combination, a respective PLMN indicator 275-1, 275-2, ... is stored in the table 270; the PLMN indicator, which includes information about a corresponding PLMN name and country adapted to be displayed on the ME display device 215.

In the subscriber identification module 240, a table 280 is stored which is similar to the table 270 in the ME 115, with MCC and MNC codes combinations 280-1, 280-2, ... and associated PLMN indicators 285-1, 285-2, .... At least one of the MCC and MNC codes combinations stored in the table 275 is associated with the file 265 provided for storing the SPN.

Every GSM or UMTS mobile telephony network broadcasts, on a prescribed broadcast channel, the respective MCC and MNC codes, to allow MEs to identify the network.

In operation, the generic ME, like the ME 115, receives the MCC and MNC codes broadcast by the mobile telephony network or networks present in the geographic area where the ME is currently located, and uses the received MCC and MNC codes to display to the user, on the display device 215, information allowing the user to identify the mobile telephony network the ME is currently registered and attached to, and a list of mobile telephony networks available in that location.

When the ME 115 receives the MCC and MNC codes broadcast by the mobile telephony network, it looks at the table 270 to find out the proper MCC and MNC codes combination, and, when the matching MCC and MNC codes combination is found, the corresponding PLMN indicator is retrieved and displayed on the display device 215; for example, if the MCC and MNC codes combination 270-1 matches the MCC and MNC received from the network, the PLMN indicator 275-1 is displayed. However, according to the 3GPP TS 22.101, Annex A, Sections A.3 ("Country/PLMN indication") and A.4 ("Service Provider Name indication"), if the matching MCC and MNC codes combination is also stored in the (table 280 of the) USIM, the PLMN indicator stored in the table 280 in association with the matching MCC and MNC codes combination overrides that stored in the ME 115, and it is this PLMN indicator that is displayed on the display device; in addition, if the matching MCC and MNC codes combination in the table 280 is one of those having associated therewith the EF-SPN file 265, like the MCC and MNC codes combination 280-1 in the drawing, the SPN stored in the file 265 may be displayed on the display device 215, possibly in parallel to, or instead of the PLMN indicator.

The content of the EF-SPN file 265, particularly the display condition settings and the SPN string, is usually changed only by the (core) mobile telephony network 290 the ME 115 is attached to. As long as the ME 115 remains attached to the same mobile telephony network, the content of the EF-SPN file 265 does not change, whereas it changes when the ME 115 detaches from the mobile telephony network it was previously attached to, and attaches to a different mobile telephony network. The content of the EF-SPN file 265 is normally the same in every ME that is attached to a certain mobile telephony network, and is related to the mobile telephony network, not to the user of the ME.

According to an embodiment of the present invention, use is made of the EF-SPN file 265, and its content is modified, to allow displaying on the display device 215 of the ME 115 user-related information, i.e. information related to a certain ME user, instead of information that relates to the mobile telephony network and is not differentiated for different users. In particular, according to an embodiment of the present invention, use is made of the EF-SPN file 265, and its content is modified, to allow displaying, on the display device 215 of the ME 115 of a user being entitled to differentiated call billing tariffs, information suitable to alert the user that she/he is located in a zone in which a certain tariff of a differentiated tariff call billing scheme applies.

Figure 3:
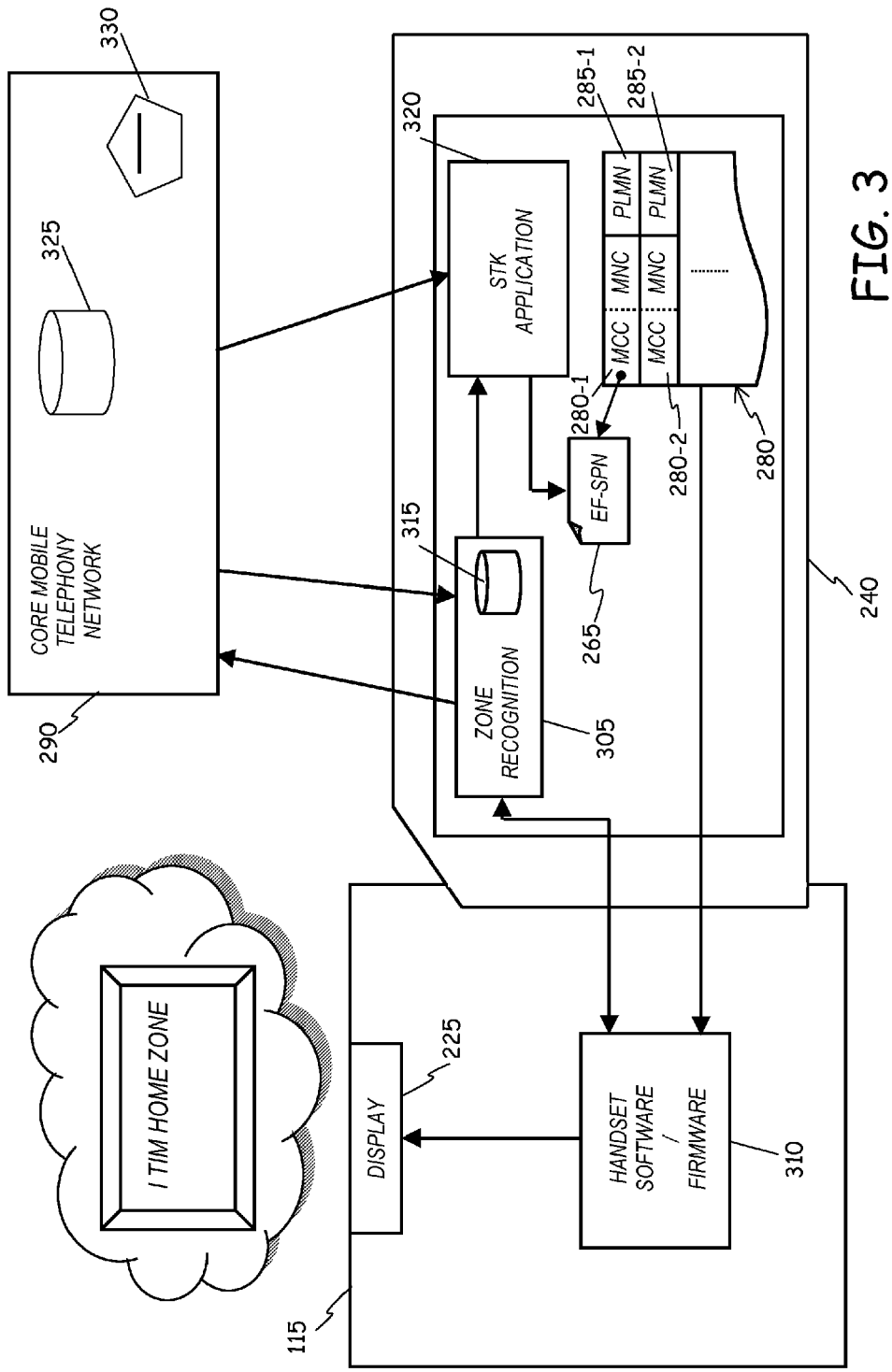
FIG. 3 schematically shows, in terms of functional blocks, including software/firmware modules, used in an embodiment of the present invention.

FIG. 3 schematically shows functional blocks, including software/firmware modules in execution, used in an embodiment of the present invention.

In the subscriber identification module 240, a zone recognition application 305 is assumed to be running, for recognizing when the ME 115 is located in a zone where a differentiated tariff applies (referring to the scenario of FIG. 1, for recognizing when, moving along the path 110, the ME 115 enters the cell 105-1). To perform its task, the zone recognition application 305 interacts with a software/firmware 310 of the ME 115 and periodically asks thereto to provide the identifier CELL-ID of the network cell the ME 115 is currently attached to; every cell of the network broadcasts its own network cell identifier CELL_ID, which is received by and thus is available to the ME 115. The zone recognition application 305 has a table or database 315 with the network cell identifiers of those network cells for which the differentiated tariff applies, and compares the network cell identifier CELL-ID received from the ME 115 with the cell identifiers included in the table 315. The table 315 is for example downloaded to the subscriber identification module 240 by the core mobile telephony network 290. When the zone recognition application 305 detects a match between the network cell identifier CELL-ID received from the ME 115 and the cell identifiers included in the table 315, the zone recognition application 305 alerts the core mobile telephony network 290 of the entrance of the ME 115 into a zone with a differentiated call billing tariff, and the network operator consequently applies the proper tariff to any call placed by the user when in that zone; similarly, when the zone recognition application 305, based on the change of network cell identifier communicated thereto by the ME 115, detects that the ME 115 is no longer in a zone having a differentiated tariff, it alerts the core mobile telephony network 290 of the exiting of the ME 115 from the zone with the differentiated call billing tariff, and the network operator returns to apply the normal tariff to any call afterwards placed by the user.

In alternative embodiments of the invention, instead of exploiting the network cell identifier CELL-ID, radio signal measurements performed by the ME 115 on the signal irradiated by the network cells are exploited to localize the ME. In this case, the zone recognition application 305 determines whether the ME 115 is currently located in a certain zone for which a differentiated tariff applies based on a comparison of the radio signal measurements communicated thereto by the ME 115 with reference radio signal measurements, stored in a table which, similarly to the table 315, is downloaded to the subscriber identification module 240 by the network operator.

According to an embodiment of the present invention, an application 320 resides on the subscriber identification module 240 for manipulating the content of the EF-SPN 265 according to the location of the ME 115. In particular, in an embodiment of the present invention, the application 320 is a STK (SIM ToolKit) application, i.e. an application based on SAT (SIM Application Toolkit) technology; however, it is understood that this is not to be intended as limitative to the present invention, and that the application 320 may be a generic application adapted to be executed by the CPU of the subscriber identification module 240.

The application 320 interacts with the zone recognition application 305, from which it gets the indication that the ME 115 has entered a zone for which a differentiated tariff applies. When this occurs, the application 320 manipulates the content of the EF-SPN 265, and changes the SPN string contained therein into another characters string, adapted to inform the user of the ME 115 that she/he currently is in the zone with differentiated tariff. For example, the string "TIM" corresponding to the Italian mobile telephony operator TELECOM ITALIA which is normally displayed to users when they connect to the network, is changed into "TIM HOME ZONE", which is adapted to inform the user of the ME 115 that she/he is in a zone for which a discounted, home zone tariff applies.

The ME software/firmware 310, in its normal operation, reads the content of the EF-SPN 265 and displays it on the display device 215; thus, the change of the string contained in the EF-SPN 265 from "TIM" into "TIM HOME ZONE" causes the display device 215 to display to the user the new indication "TIM HOME ZONE", and the user of the ME 115 is thus informed that she/he has entered the zone with discounted call billing tariff.

Figure 4:
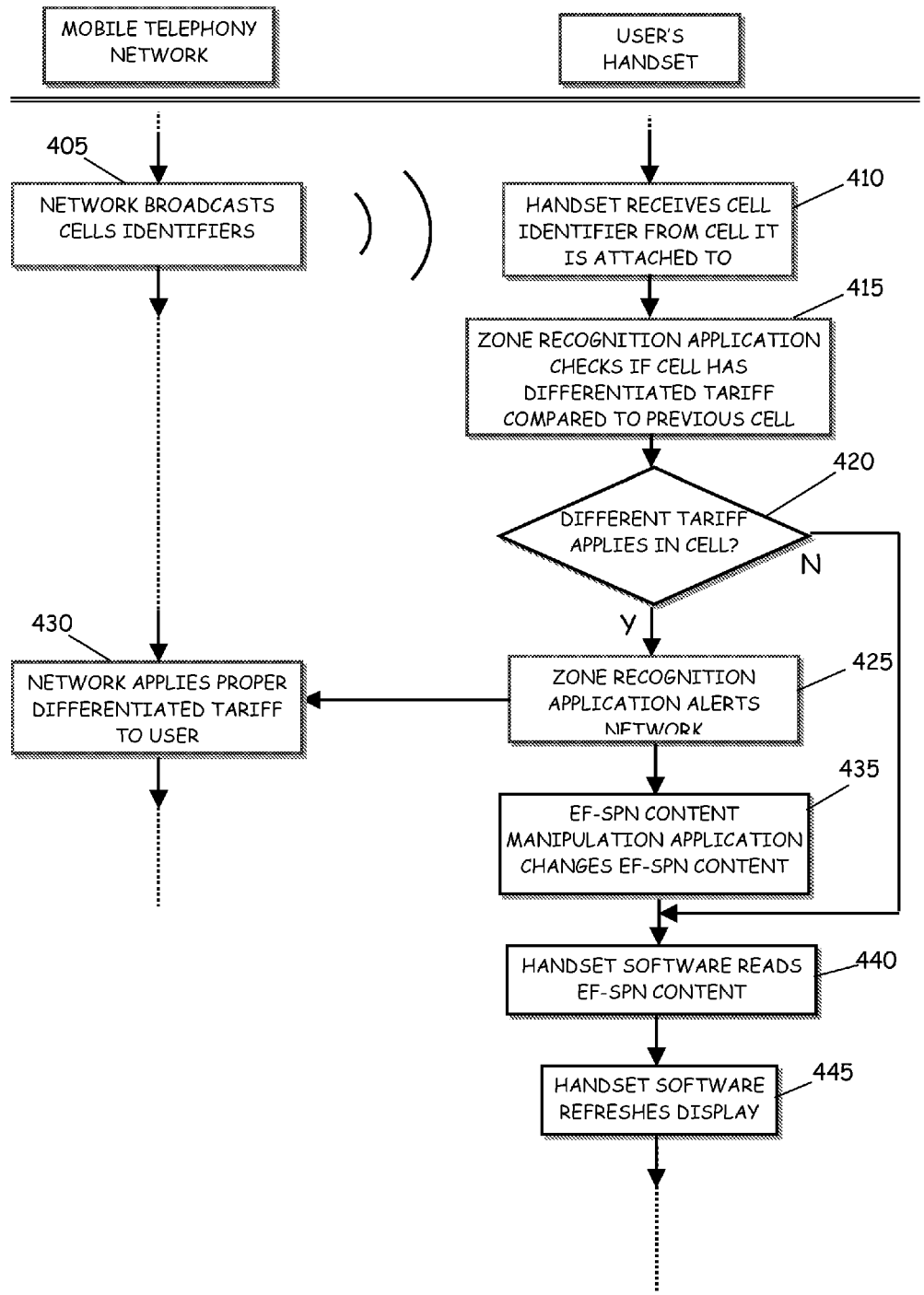
FIG. 4 is a schematic flowchart illustrating some steps of a method according to an embodiment of the present invention.

FIG. 4 is a schematic flowchart with the main actions performed by the ME 115 when implementing a method according to an embodiment of the present invention.

The transceiver stations 105-1, 105-2, . . . of the mobile telephony network broadcasts through the respective cells the respective cell identifiers CELL-ID (block 405). The ME 115 receives the cell identifier of the network cell it is currently attached to (block 410); for example, considering the hypothetical mobility path 110 depicted in FIG. 1, when the ME 115 is in cell 105-2, and is attached to the transceiver station 105-2, it receives the cell identifier of that cell, and the cell identifier it receives changes as the user of the ME 115 moves along the path 110 visiting cells 105-7, 105-6 and 105-1.

The zone recognition application 305 from time to time, e.g. periodically, asks the software/firmware 310 of the ME 115 to provide the identifier CELL-ID of the network cell the ME 115 is currently attached to, and checks (looking at the table 315 of network cells identifiers it has) whether, in the cell the ME 115 is currently attached to, a different tariff applies compared to that which applied in the network cell the ME 115 was previously attached to (block 415). In the negative case (exit branch N of decision block 420), the zone recognition application 305 does nothing and the actions flow jumps ahead to block 440, otherwise (exit branch Y of decision block 420) the zone recognition application 305 alerts the core network 290, for example by means of USSD (Unstructured Supplementary Services Data) or SMS signalling, that a different tariff has to be applied to any call placed by the user of the ME 115 (block 425). The mobile telephony network 290 receives the alert and applies the proper tariff to the user (block 430).

The EF-SPN content manipulation application 320, interacting with the zone recognition application 305, for example sniffing the alerts it issues to the mobile telephony network 290, is made aware of the fact that the ME 115 has entered a zone where a differentiated tariff applies, and consequently changes the SPN contained in the EF-SPN 265 stored in the subscriber identification module 240 (block 435). For example, when the user of the ME 115 enters the network cell 105-1 which is assumed to be in a zone where the home of the user is located, and a discounted tariff TARIFF B applies, the EF-SPN content manipulation application 320 changes the SPN in the EF-SPN 265 from the usual "T/M" to "TIM HOME ZONE". Similarly, when the user of the ME 115 leaves the cell 105-1 and enters a cell in a zone where the normal tariff TARIFF B applies, the EF-SPN content manipulation application 320 changes the SPN in the EF-SPN 265 from "TIM HOME ZONE" back to "TIM". It is worth underlying that the change in the content of the EF-SPN 165 is not the consequence of the change of the mobile telephony network the ME 115 is attached to.

The ME 115 software/firmware 310 accesses the table 280 in the subscriber identification module 240 where the MCC and MNC codes combinations are stored, and looks for the MCC and MNC codes combination matching that received from the transceiver station the ME 115 is currently attached to; then, if the matching MCC and MNC codes combination is one to which the EF-SPN 265 is associated, the ME 115 software/firmware 310 reads the content of the EF-SPN 265 (block 440) and causes the refresh of the display device 215 (block 445).

In this way, as the user of the ME 115 moves entering and exiting zones where differentiated tariffs applies, she/he is promptly informed of the zone where she/he is currently located, and thus the user can immediately know which tariff will apply to the calls she/he will place.

In the above description, the simple case of only two different tariffs has been considered by way of example. However, the present invention applies as well in cases where three or more different tariffs are envisaged, for three or more different types of zones, like for example a basic tariff, a first tariff for calls placed when the user in is the home zone, a second tariff for calls placed when the user is in the office zone, a third tariff for calls placed when the user is in a certain urban area, for example in the city where she/he lives or works (while not being in the home zone or in the office zone), and a basic tariff for calls placed when the user is in any other zone.

For example, in some invention embodiments the EF-SPN content manipulation application 320 may store a list of different SPN strings, each one corresponding to a different geographic zone in respect of which a different call billing scheme applies; each SPN string may be associated with one or more corresponding network cell identifiers, identifying network cells located in that zone. The EF-SPN content manipulation application 320 may derive from the zone recognition application 305 the information about the network cell identifier CELL-ID of the cell the ME 115 is currently attached to, and compare this cell identifier with those in the stored list to determine which SPN string to write in the EF-SPN 265.

Advantageously, the SPN character string or strings that the EF-SPN content manipulation application 320 stores and uses to modify the content of the EF-SPN 265 can be downloaded from the mobile telephony network Over The Air (OTA); in this way, the mobile telephony network operator can customize the information displayed to the user of the ME 115 according to personalized call billing schemes that may vary in time.

Although in the foregoing embodiments of the present invention have been presented which relates to alerting the ME 115 user when she/he is in zones where differentiated tariffs apply, this is not the only possible application of the present invention; hereinafter, embodiments of the present invention will be presented that are not strictly related to the differentiation of call billing schemes based on the user localization.

For example, in an embodiment of the present invention, the mobile telephony network operator may take advantage of the possibility of updating, by downloading OTA to the ME 115, the SPN string or strings that the EF-SPN content manipulation application 320 stores and uses to modify the content of the EF-SPN 265 to alert the user of special call billing tariffs that the network operator offers in peculiar days or time periods of the year. Just by way of example, the network operator may offer to individual users special, discounted tariffs, or even free calls, in Christmas time, holiday time, or in user-specific days like on a generic user birthday. In these cases, when the mobile telephony network operator recognizes that the current date corresponds to the predetermined day or days for which the special tariff applies to that subscriber user (possibly as specified in a subscriber user profile database 325 available to the mobile telephony network operator), the mobile telephony network 290 sends one or more configuration messages to the user's ME 115, for configuring the EF-SPN content manipulation application 320 so as to change the SPN string or strings it stores or to provide new SPN strings (for example, the configuration message or messages may include SPN strings like "TIM XMAS" or "TIM BIRTH"); upon receiving the configuration message or messages, the EF-SPN content manipulation application 320 changes the SPN in the EF-SPN using the SPN string received from the network 290, and the new string will be displayed to the ME 115 user, who is thus made aware that the special tariff applies to calls she/he will place. When the predetermined day or days have passed, the network operator reconfigures the EF-SPN content manipulation application 320, so that the usual SPN string will be displayed to the user.

In another embodiment of the present invention, the mobile telephony network operator may take advantage of the possibility of updating, by downloading OTA, the SPN string or strings that the EF-SPN content manipulation application 320 stores and uses to modify the content of the EF-SPN 265 to alert the user that she/he has received a new voice message or a new e-mail message in his/her voicebox or mailbox. For example, when the network operator ascertains that the user of ME 115 has received a new voice message or a new e-mail message in a voicebox or mailbox 330, the mobile telephony network sends one or more configuration messages to the user's ME 115, for configuring the EF-SPN content manipulation application 320 so as to change the SPN string or strings it stores (for example, the configuration message or messages may include SPN strings like "TIM NEWMSG"); upon receiving the configuration message or messages, the EF-SPN content manipulation application 320 changes the SPN in the EF-SPN using the SPN string received from the network operator, and the new string will be displayed to the ME 115 user, who is thus made aware that she/he has received a new voice or e-mail message. When the user accesses her/his voicebox or mailbox and listens to or reads the new message, or after the lapse of a predetermined time, the network operator reconfigures the EF-SPN content manipulation application 320, so that the usual SPN string will be displayed to the user.

In still another embodiment of the present invention, the mobile telephony network operator may take advantage of the possibility of updating, by downloading OTA, the SPN string or strings that the EF-SPN content manipulation application 320 store and uses to modify the content of the EF-SPN 265 to cause the display of short advertisement messages on the display device 215 of the user ME 115, particularly in respect of individual users that accepted this behavior having discounts on tariff in return. For example, the network operator may send, to selected users that previously accepted it (for example, as specified in the users' profiles stored in the database 325), one or more configuration messages to the user's ME 115, for configuring the EF-SPN content manipulation application 320 so as to change the SPN string or strings it stores (for example, the configuration message or messages may include SPN strings like "TIM LOVE XYZ"); upon receiving the configuration message or messages, the EF-SPN content manipulation application 320 changes the SPN in the EF-SPN using the SPN string received from the network operator, and the new string will be displayed to the user of the ME 115. After the lapse of a predetermined time, the network operator reconfigures the EF-SPN content manipulation application 320, so as to change the advertisement message or to cause the display of the usual SPN string to the user.

The strings used to modify the content of the EF-SPN 265, and thus to be displayed on the display device 215 of the user ME 115, may also be configurable by the user herself/himself. For example, the user may send an SMS to a predetermined number made available by the network operator, and include in the SMS message the string she/he wishes to be displayed on her/his ME 115. Alternatively, the user may access a web portal of the network operator, enter a private web site section, and modify the string she/he wishes to be displayed. The network operator may thus send to the ME of that user one or more configuration messages to the user's ME 115, for configuring the EF-SPN content manipulation application 320 so as to change the SPN string or strings it stores according to the user preferences (for example, the configuration message or messages may include SPN strings like "I TIM FABIO", with the name of the user); upon receiving the configuration message or messages, the EF-SPN content manipulation application 320 changes the SPN in the EF-SPN using the SPN string received from the network operator, and the new string will be displayed to the ME 115 user. Alternatively, the EF-SPN content manipulation application 320 may expose to the user an STK interface, and the user may directly enter the string she/he wishes to be displayed using the keyboard of her/his handset; the EF-SPN content manipulation application 320 then replaces the SPN string present in the EF-SPN 265 with the user-inputted string, and thus causes the display of the new string on the display 215 of the user ME 115.

In a further embodiment of the invention, the user of the ME 115 having a subscriber identification module 240 capable of connecting to a local wireless sensor network, for example having a ZigBee interface 295, or an NFC (Near Field Communication), interface may be promptly alerted, by displaying a predetermined string on the display device 215 of the ME 115, of the available connection to a locally available wireless sensor network. When the (interfaces of the) subscriber identification module 240 recognizes the presence of an end point or of a wireless sensor network, it connects thereto; the EF-SPN content manipulation application 320 may monitor the status of the wireless sensor network interface in the SIM, and when it detects the connection to an available wireless sensor network, the EF-SPN content manipulation application 320 may change the SPN string in the EF-SPN 265 (for example into "TIM ZNET"); thus, the software/firmware of the ME 115 causes the prompt display to the user, on the display device 215, of the indication that a wireless sensor network is present and the ME 115 is connected thereto. Similar considerations may apply to the case in which the ME 115 is a dual-mode phone capable of attaching to a Wi-Fi network, for example when the user is at home, for performing VoIP phone calls; the EF-SPN content manipulation application 320 (or another application resident in the subscriber identification module 240) may get from the ME 115 the indication that the latter is attached to the Wi-Fi network, and the EF-SPN content manipulation application 320 may change the content of the EF-SPN 265 accordingly to alert the user.

Thanks to the present invention, it is possible to cause user-related information to be displayed to a user on her/his handset's display in a way that is related to that specific user, essentially in real time, and under the control of the mobile telephony network operator.

Several possible embodiments of the present invention has been described in the foregoing, however those skilled in the art will recognize that several changes to the described embodiments, as well as alternative invention embodiments are possible, without departing from the scope of the invention as defined in the appended claims.

For example, if the handset also supports SPN graphics (as defined by the 3GPP TS 22.101), the present invention can be used to cause the display of differentiated images, instead of simple character strings.

Although in the described invention embodiments related to the differentiation of billing tariffs reference has been made to billing of phone calls, this is not to be construed limitatively, because all applies in general for the differentiation of billing of any connectivity service, such as for example download of data, mobile TV and other multimedia services.

Also, the detection of the localization of the user for purposes of applying differentiated phone call or other service billing tariffs may be made by the mobile telephony network, instead of by the user's handset and, in particular, by the subscriber identification module, as described in the foregoing.

The invention claimed is:
1. A method, comprising:
identifying a file stored in a subscriber identification module operatively associated with a user's mobile telephony handset, wherein the identified file stores a name of a mobile telephony service provider displayable on a display of the user's mobile telephony handset;

in response to detecting an event, determining user-related information to be displayed on the display, wherein the user-related information comprises information other than the name of the mobile telephony service provider; and in response to determining the user-related information, modifying the identified file to include the user-related information to be displayed on the display.

2. The method of claim 1, wherein said user-related information includes information which, when displayed on the display of the user's mobile telephony handset, is adapted to alert the user of a mobile telephony service billing tariff currently applied to the user by a mobile telephony network to which the user's mobile telephony handset is attached.

3. The method of claim 2, wherein said mobile telephony service billing tariff is one among at least two mobile telephony service billing tariffs of a differentiated billing tariff scheme applied by the mobile telephony service provider to the user.

4. The method of claim 3, wherein said at least two mobile telephony service billing tariffs correspond to respective predetermined locations of the user's mobile telephony handset, and wherein said detecting the event comprises detecting that the mobile telephony handset of the user is currently located in one of said predetermined locations.

5. The method of claim 4, wherein said detecting that the mobile telephony handset of the user is currently located in one of said predetermined locations comprises comparing an identifier of a mobile telephony network cell to which the mobile telephony handset is currently attached with at least one predetermined network cell identifier, or comparing radio signal measurements performed by the mobile telephony handset on a radio signal irradiated by the mobile telephony network cell to which the mobile telephony handset is currently attached with reference radio signal measurement values.

6. The method of claim 3, wherein said at least two mobile telephony service billing tariffs correspond to different time periods.

7. The method of claim 1, wherein said detecting the event comprises detecting that the mobile telephony handset of the user is currently connected to a wireless sensor network, and said user-related information is adapted to alert the user of the connection to the wireless sensor network.

8. The method of claim 1, wherein the identified file comprises an Elementary File-Service Provider Name (EF-SPN), and wherein the name of the mobile telephony service provider is identified by a Service Provider Name (SPN).

9. The method of claim 1, wherein said user-related information is adapted to alert the user of the mobile telephony handset of a receipt of one or more messages in a user message box held by a mobile telephony network and associated with the user.

10. The method of claim 1, wherein said user-related information to be displayed is received by the mobile telephony handset from a mobile telephony network over the air.

11. The method of claim 1, wherein said subscriber identification module is compliant with 3GPP Technical Specifications 22.101 and 31.102, and wherein said identified file comprises an EF-SPN file.

12. A subscriber identification module for use in a mobile telephony handset, comprising:
 a processor; and
 memory storing:
  a resident file used to store a name of a mobile telephony service provider to be displayed on the mobile telephony handset when attached to a network of said mobile telephony service provider, and
  an application, when executed by the processor, configured to perform steps comprising:
   in response to detecting an event, determining user-related information to be displayed on the mobile telephony handset, wherein the user-related information comprises information other than the name of the mobile telephony service provider; and
   in response to determining the user-related information, modifying the resident file to include the user-related information to be displayed on the mobile telephony handset.

13. The subscriber identification module of claim 12, wherein said user-related information includes information which, when displayed on the mobile telephony handset, is adapted to alert a user of the mobile telephony handset of a mobile telephony service billing tariff currently applied to the user by a mobile telephony network to which the mobile telephony handset is attached.

14. The subscriber identification module of claim 13, wherein said detecting the event comprises detecting that the mobile telephony handset is currently located in one of at least two predetermined locations of the mobile telephony handset in respect of which different mobile telephony service billing tariffs applies to mobile telephony services exploitable by the user of the mobile telephony handset.

15. The subscriber identification module of claim 14, operable to perform said detecting that the mobile telephony handset is currently located in one of at least two predetermined locations by comparing an identifier of a mobile telephony network cell to which the mobile telephony handset is currently attached with at least one predetermined network cell identifier, or by comparing radio signal measurements performed by the mobile telephony handset on a radio signal irradiated by the mobile telephony network cell to which the mobile telephony handset is currently attached with reference radio signal measurement values.

16. The subscriber identification module of claim 13, wherein said mobile telephony service billing tariff is one among at least two mobile telephony service billing tariffs of a differentiated billing tariff scheme applied by the mobile telephony service provider to the user, and wherein said at least two mobile telephony service billing tariffs correspond to different time periods.

17. The subscriber identification module of claim 12, wherein said detecting the event comprises detecting that the mobile telephony handset is currently connected to a wireless sensor network, and said user-related information is adapted to alert a user of the mobile telephony handset of the connection to the wireless sensor network.

18. The subscriber identification module of claim 12, wherein the resident file comprises an Elementary File - Service Provider Name (EF-SPN), and wherein the name of the mobile telephony service provider is identified by a Service Provider Name (SPN).

19. The subscriber identification module of claim 12, operable to receive said user-related information to be displayed from a mobile telephony network over the air.

20. The subscriber identification module of claim 12, wherein said subscriber identification module is compliant with 3GPP Technical Specifications 22.101 and 31.102, and wherein said resident file comprises an EF-SPN file.

21. The method of claim 1, further comprising:
 if the identified file stores the name of the mobile telephony service provider, displaying the name of the mobile telephony service provider on the display of the user's mobile telephony handset; and if the identified file is modified to include the user-related information, displaying the user-related information on the display of the user's mobile telephony handset.

22. The subscriber identification module of claim 12, wherein the application, when executed by the processor, is configured to perform steps comprising:

if the resident file stores the name of the mobile telephony service provider, instructing the mobile telephony handset to display the name of the mobile telephony service provider on the mobile telephony handset; and if the resident file is modified to include the user-related information, instructing the mobile telephony handset to display the user-related information on the mobile telephony handset.

* * * * *